L. B. SKINNER.
FRUIT DRIER.
APPLICATION FILED SEPT. 26, 1912.
1,049,930.
Patented Jan. 7, 1913.
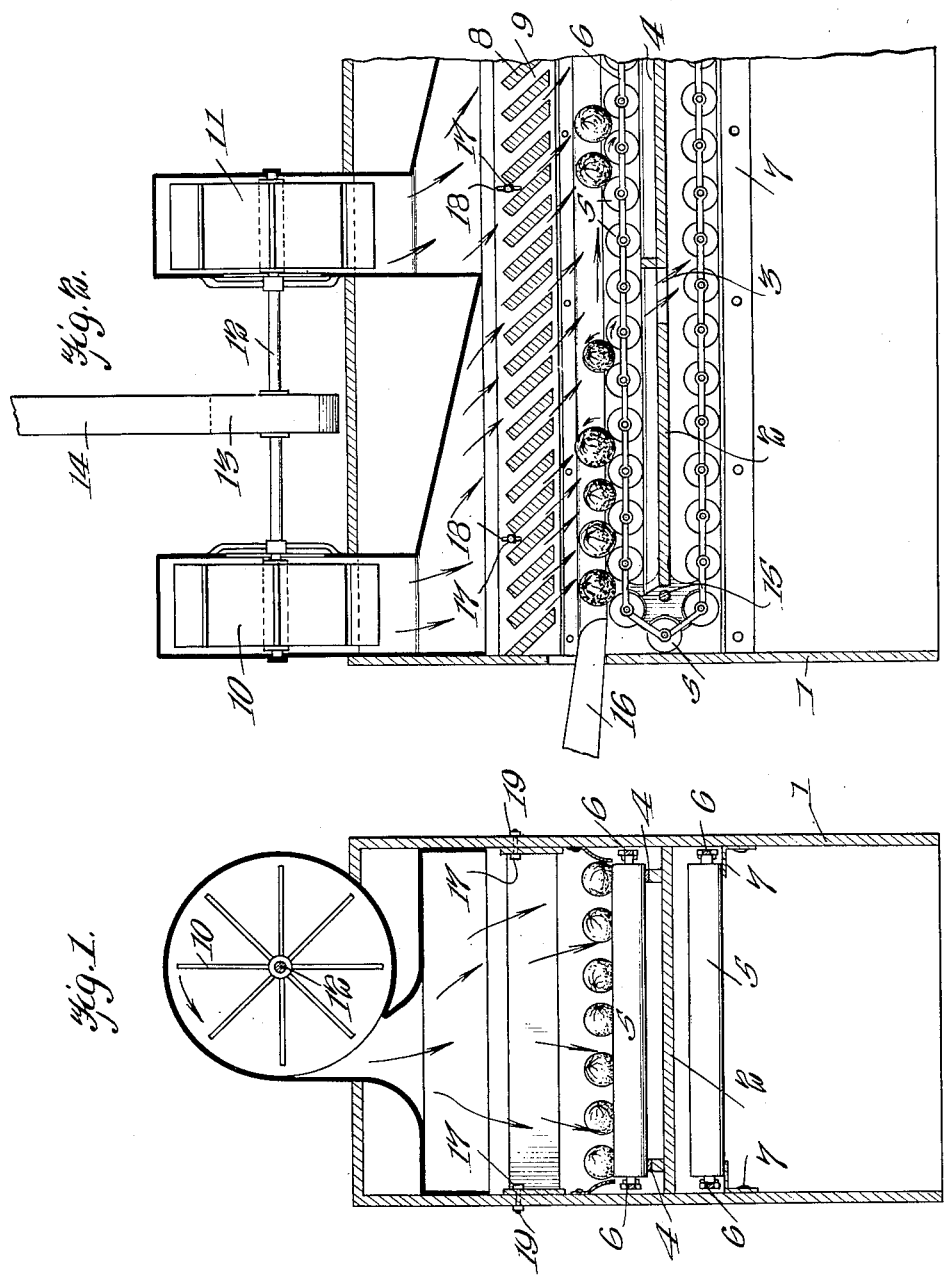
WITNESSES
INVENTOR
LEE B. SKINNER,
BY
ATTORNEYS

UNITED STATES PATENT OFFICE.

LEE BRONSON SKINNER, OF DUNEDIN, FLORIDA.

FRUIT-DRIER.

1,049,930.

Specification of Letters Patent.

Patented Jan. 7, 1913.

Application filed September 26, 1912. Serial No. 722,438.

*To all whom it may concern:*

Be it known that I, LEE B. SKINNER, a citizen of the United States, and a resident of Dunedin, in the county of Hillsboro and State of Florida, have made certain new and useful Improvements in Fruit-Driers, of which the following is a specification.

My invention relates to improvements in devices for drying fruit, and it consists in the combinations, constructions and arrangements herein described and claimed.

An object of my invention is to provide a device by which fruit, such as oranges, grape fruit and the like, may be dried quickly subsequent to the operation of washing the same, the device being economical in its operation.

A further object of my invention is to provide a simple device for drying fruit thoroughly, one which has few parts, and is not liable to easily get out of order.

A further object of my invention is to provide a device in which small streams of air are forced directly upon fruit which is rotated so as to bring all parts of the fruit into direct contact with the moving streams of air.

Other objects and advantages will appear in the following specification and the novel features of the device will be particularly pointed out in the appended claims.

My invention is illustrated in the accompanying drawings forming part of this application in which—
Figure 1 is a transverse section through a drying device, and Fig. 2 is a longitudinal section through a portion thereof.

In carrying out my invention I provide a main casing 1 such as that shown in Figs. 1 and 2. This casing is elongated and is divided into three compartments, upper, lower and middle compartments. Between the middle compartment and the lower compartment is a partition 2. The partition 2 is provided with openings 3 at intervals. Disposed upon the partition 2 are tracks 4 upon which are mounted rollers 5, the latter being connected at each end to an endless chain 6, which extends around the ends of the partition 2, as shown in Fig. 2, and thence down into the lower compartment. In the lower compartment, the rollers are supported by means of brackets 7. Each roller is pivotally connected with the chains 6, so as to revolve when drawn along the track 4. A series of inclined strips 8 divides the middle or central compartment from the upper compartment. These inclined strips have passages 9 between them, which are inclined as shown in the drawings. Communicating with the upper compartment are fans, such as those shown at 10 and 11, which supply the air (either hot or cold) for drying the fruit. These fans are located on a common power shaft 12, upon which is disposed a pulley 13 driven by a power belt 14. The chain 6 may be driven in any suitable manner, as for instance by means of a sprocket wheel 15, which is arranged to receive the rollers 5, as shown in Fig. 2. A delivery chute 16 is provided for conducting the fruit into the central compartment upon the rollers.

From the foregoing description of the various parts of the device the operation thereof may be readily understood. The fans or blowers are set in motion and the fruit is delivered through the chute 16 upon the tops of the rollers 5 in the central compartment. The chains are traveling in the direction indicated by the arrow and the rollers are therefore revolving as shown by the curved arrows. The fruit tends to revolve in the direction indicated by the curved arrows shown in Fig. 2. The fruit passes underneath the passages 9 and receives the air which is forced down through these passages 9 by means of the blowers 10 and 11. The latter are kept running at such a speed that air in the upper compartment above the passages 9 is compressed to a certain extent, so that there is always a steady stream of air through the passages directly upon the fruit. This is a far more efficient means of drying fruit than where the same is placed in a large compartment, through which air is being forced, since it is obvious that where the air is divided and is forced in small streams directly against the fruit the drying will be more quickly accomplished. The frame 17 which bears the strips 8 may be adjusted toward and away from the fruit by any suitable means. In the drawing, I have shown the member 17, as slotted at 18 and being provided with bolts 19, which may be tightened after the frame is shifted. Thus the distance of the ends of the passages 9 above the fruit may be adjusted.

It will be noted that the passages are inclined so as to deliver air upon those surfaces of the fruit which are moving in direct opposition to the air. That is, the fruit is always revolving in opposition to the small streams of air, which are being forced down upon it. This hastens the drying operation.

I claim:

1. In a fruit drier, a casing, endless traveling chains disposed in said casing, a series of rotatable rollers carried by said chains, a track for said rollers, said rollers being arranged to receive fruit, and means for delivering small streams of air directly above the fruit.

2. In a fruit drier, a casing, endless traveling chains disposed in said casing, a series of rotatable rollers carried by said chains, a track for said rollers said rollers being arranged to receive fruit, and means for delivering small streams of air directly above the fruit, said means comprising a frame having a series of inclined passages therethrough.

3. In a fruit drier, a casing, endless traveling chains disposed in said casing, a series of rotatable rollers carried by said chains, a track for said rollers, said rollers being arranged to receive fruit, means for delivering small streams of air directly above the fruit, said means comprising a frame having a series of inclined passages therethrough, and means for compressing the air above the frame.

LEE BRONSON SKINNER.

Witnesses:
GERTRUDE P. MORTON,
B. C. SKINNER.